Figure 1:
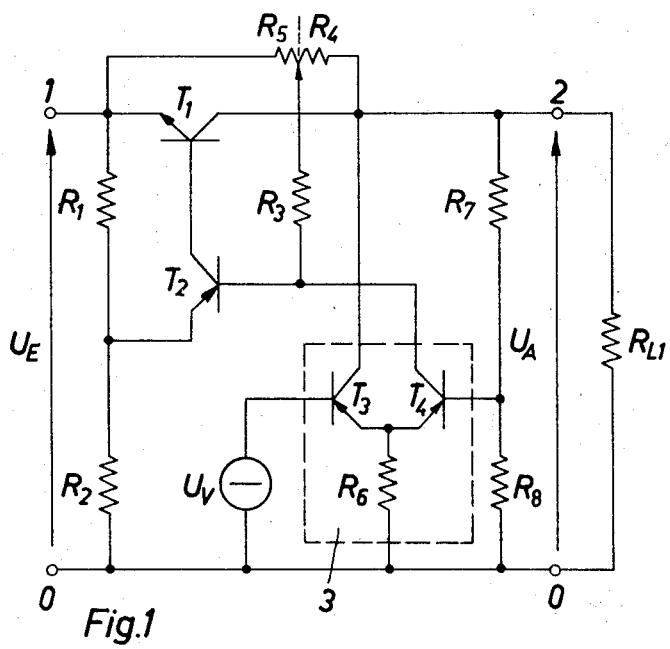

United States Patent

[11] 3,579,089

| | | | | |
|---|---|---|---|---|
| [72] | Inventor | Wilfried Elmar Giess<br>Mannheim, Germany | | |
| [21] | Appl. No. | 789,565 | | |
| [22] | Filed | Jan. 7, 1969 | | |
| [45] | Patented | May 18, 1971 | | |
| [73] | Assignee | Brown, Boveri & Cie Aktiengesellschaft<br>Mannheim-Kafertal, Germany | | |
| [32] | Priority | Jan. 11, 1968 | | |
| [33] | | Germany | | |
| [31] | | P 16 13 977.8 | | |

[54] STABILIZED POWER SUPPLY CIRCUITS
6 Claims, 2 Drawing Figs.

[52] U.S. Cl. .................................................. 323/22, 323/38
[51] Int. Cl. .................................................. G05f 1/56
[50] Field of Search .................................. 323/4, 9, 22 (TSCR), 20, (Termatrex), 38, 8; 317/33

[56] References Cited

UNITED STATES PATENTS

| 3,263,156 | 7/1966 | Isaacs | 323/9 |
| 3,317,817 | 5/1967 | Gershen | 323/22X(T) |
| 3,344,340 | 9/1967 | Webb | 323/22(T) |
| 3,405,319 | 10/1968 | Barringer | 317/33X |

Primary Examiner—J. D. Miller
Assistant Examiner—G. Goldberg
Attorney—Jacobs & Jacobs ABSTRACT: A stabilized power supply circuit is provided having a transistor series control circuit, a resistance voltage divider shunting the load, a control circuit with a control amplifier and a reference voltage source as well as a circuit for superposing disturbances derived from input voltage variations.

Patented May 18, 1971

3,579,089

Inventor:
WILFRIED ELMAR GIESS
By Jacobs & Jacobs

STABILIZED POWER SUPPLY CIRCUITS

The invention is a transistorized constant voltage source which consists of a transistor in a series circuit, a resistance voltage divider shunting the load, a control circuit with an automatic volume control circuit, and a reference voltage source as well as a noise circuit for bypassing input voltage variations.

The purpose of a constant voltage source is to provide a constant output voltage or constant output current with the proper modification. The output voltage will then be independent of the variations in the output load and the supply voltage.

In a known constant voltage source, such as Circuit No. 10 in the "Circuit Examples" of the 1967 issue of "Intermetall," the output voltage is regulated in the following way: When, as the result of a change in the input voltage, there is a differential between the voltage across the output terminals and the reference voltage obtained from the voltage divider, the differential is converted by the control transistor, which operates as a differential amplifier, into a proportional variation in the collector current corresponding to the slope of the transistor's transfer characteristic. This is applied to the transistor collector current so that the actual value of the output voltage, with proper direction of adjustment, is returned to practically its desired value. The remaining difference varies inversely as the steepness of the control transistor's transfer characteristic. In this kind of proportional control, variations in the output voltage still remain.

The needs of measurement technique demand high output voltage regulation. To obtain this in a relatively simple way, a noise circuit is provided to compensate for the remaining voltage difference. It operates as follows: a current proportional to the input voltage is put through a variable resistor in the input circuit, this current being taken from the voltage divider. With a change in input voltage, a corresponding potential difference is applied to the control amplifier, thus compensating for the remaining error. This potential difference can be set only by the noise circuit and the variable resistor.

Another control circuit is provided for the noise circuit. It consists of a resistor between the negative input voltage and the control amplifier input which obtains a current proportional to the input voltage from the output voltage divider at the input to the control amplifier. Here, an NPN silicon transistor is used as the control device in the series circuit. The emitter is at the negative input potential, and the transistor itself is low in residual current. It is shunted by a differential amplifier, consisting of two transistors, used as a control amplifier. The base of one of these transistors is connected to a constant reference voltage; the base of the other, the input to the control amplifier, is connected to the divided output voltage. A disadvantage of this system is that if, for example, there should be an increase in the input voltage, it will be carried completely over to the collector-emitter voltage of one of the control transistors. As a result, the maximum permissible rise in input voltage is limited by the maximum permissible collector-emitter voltage of the control transistor.

The function of the device is to reduce the voltage rating of the control amplifier transistor and make the control circuit proper largely independent of the input voltage variations through the use of the noise circuit. It is enabled to perform that function by its use of a preliminary transistor stage whose collector is tied to the base of the control circuit transistor and whose base is connected through a resistor to the voltage divider bleeder and to the output of the control amplifier. The voltage divider consists of two resistors and is in parallel with the control circuit transistor between the input and output. Between both input terminals of the device is a series circuit of two resistors; the junction point of these resistors is connected to the emitter of the preliminary transistor stage.

An advantageous modification of the constant voltage source, according to the invention, provides the connection of the transistor emitter through a resistor to the reference voltage, and also to the emitter of a transistor whose collector is in the input and whose base is connected to a tap on the voltage divider. For the constant voltage source to operate in a simple fashion as a constant current source, a series circuit for constant consumption is provided with the load resistor maintained constant.

The series control circuit can be improved even further by setting up a cascade connection in which the power consumption of the transistor stage is reduced and the resistance of the input voltage divider increased to reduce the input power consumption.

Figure 2:
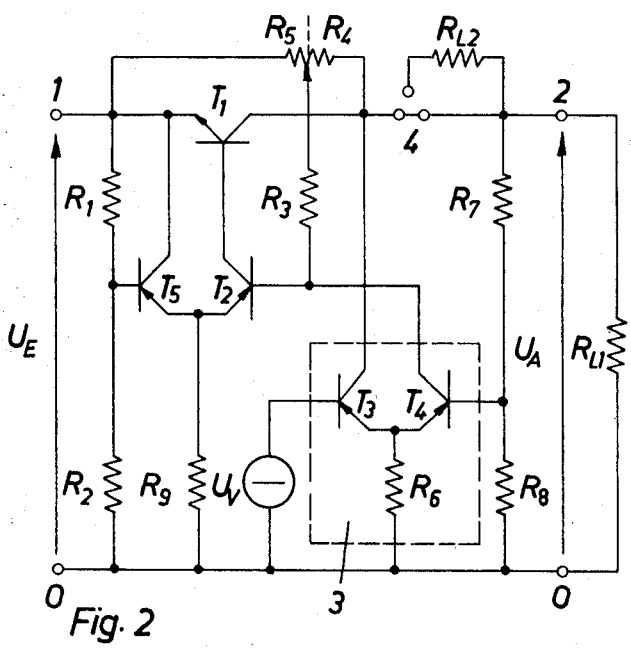

In what follows, the design and operation of the device will be explained with reference to FIGS. 1 and 2 of the accompanying drawing wherein:

FIG. 1 is a transistorized constant voltage source showing the device's transistor stage and the noise circuit voltage dividers, and FIG. 2 is a DC voltage source in which the transistor stage is supplemented with another transistor to form a differential amplifier stage.

In the circuit of FIG. 1, the collector and emitter of transistor $T_1$ are connected in series between input terminal 1 and output terminal 2. This transistor is the series control circuit in the DC voltage source whose output voltage $U_A$, between terminals 0 and 2, is to be held constant. Thus, $U_A$ is the control quantity which depends on the load across terminals 0 and 2, the variations in the input voltage $U_E$ across terminals 0 and 1, and other disturbances such as electrical noise. A voltage divider consisting of $R_4$ and $R_5$ is connected in parallel with the collector and emitter of $T_1$. Another voltage divider consisting of the two resistors $R_1$ and $R_2$ in series is connected between the input terminals 0 and 1. The base of transistor $T_1$ is controlled by transistor $T_2$ whose emitter is connected to the tap of the input voltage divider $R_1$ and $R_2$, and whose base is connected through resistor $R_3$ to the tap of a voltage divider consisting of $R_4$ and $R_5$ between the input and output and parallel to transistor $T_1$.

The base of the transistor $T_2$ is controlled by the output of control amplifier 3. This control amplifier is indicated in FIG. 1 by the dotted lines and is a differential amplifier made up of transistors $T_3$ and $T_4$ with the common emitter resistor $R_6$. A reference voltage source $U_V$, which supplies a constant voltage, is brought to the base of $T_3$. The base of $T_4$ is connected to a tap of a voltage divider consisting of resistors $R_7$ and $R_8$ between output terminals 0 and 2 parallel to resistor $R_1$. The output voltage is maintained constant through the control of transistor $T_1$. The control quantity is not only proportional to the change in output, which is indicative of the back correction to be made, but is also proportional to the change in the input voltage, indicative of the forward correction. The back correction is obtained in the following way: The voltage difference, obtained from control amplifier 3, between the constant reference voltage $U_V$ at the base of $T_3$ and the voltage at the base of $T_4$ corresponding to the subdivided output voltage at resistor $R_8$, is converted to a change in output current in accordance with the transfer characteristic slope of transistors $T_3$ and $T_4$. The output signal of the control amplifier 3 is applied to the base of the transistor $T_2$, where it is again amplified, and is then brought to the base of control transistor $T_1$. Its effect is to correct for the output deviation by adjusting the control circuit. If, for example, the output voltage $U_A$ should climb because of a momentary disconnection of part of the load, the difference in voltage at the input to control amplifier 3 also rises. The contribution of $T_2$ to the transistor $T_1$ is such— i.e., the collector-emitter resistance increases to that point— that the output voltage deviation practically disappears and the output voltage $U_A$ again reaches its initial value.

The forward correction is obtained through the input voltage divider of $R_1$ and $R_2$, the control voltage divider of $R_4$ and $R_5$, and the transistor $T_2$ whose special function it is to assume part of the voltage difference between the base of the control resistor and the emitter of the control amplifier $T_4$. Suppose that the load across the output terminals 0 and 2 is constant. Suppose also that some disturbance causes a change in the input voltage $U_E$ at the input terminals 0 and 1, and that $U_E$ increases. The potential at the tap of the two voltage dividers $R_1$, $R_5$ and $R_1$, $R_2$ will simultaneously rise. With a particular change in the voltage divider, a smaller current flows to the base of the first stage transistor through $R_3$. Thus, the collector current, which is reduced, according to the current amplification, flows into the base of $T_1$ and contributes further to the collector-emitter circuit. The voltage across it drops, therefore, and the change in the input voltage does not result in a change in the output. If $U_E$ should drop from a constant value, the action is reversed: the control circuit is driven further than before and there is less voltage applied to it. Here again the output voltage is unaffected by the change in the input.

This regulation of the input voltage variations follows from the voltage division relationship:

$$\frac{R_5}{R_4+R_5} = \frac{R_3}{(R_4+R_5) h_{21T_1} h_{21T_2}} + \frac{R_1}{R_1+R_2} \left(1 + \frac{R_2}{(R_4+R_5)h_{21T_1}}\right)$$

if it is assumed that $$R_4 + R_5 \ll \frac{1}{h_{22T_1}}$$

and $$R_3 \gg (R_4 + R_5)$$

$$h_{21T_1}$$

and the variations are linear. In the equation, $h_{21}$ is the small signal current amplification and $h_{22}$ is the small signal transistor output conductivity.

Because of transistor rating differences, the voltage dividers $R_4$ and $R_5$ preferably may be made adjustable to provide optimal balance. The control amplifier 3 stabilizes the balance point and keeps the control circuit transistor from being tipped to a high or low resistance state.

A change in the input voltage, i.e., the noise circuit, according to the invention, is used as a regulating quantity. The control circuit with the control amplifier 3 has the function of fine adjustment and of controlling disturbances or noise that may occur as the result of nonlinearities and aging in the transistor $T_2$ and the control circuit transistor, as well as regulating output voltage variations that may occur through load changes or temperature effects.

The equation for the voltage division $R_5/(R_4+R_5)$ shows that with increasing current amplification $h_{21T_1}$ of the control circuit transitor, the value of this expression opposes the value of the input voltage divider $R_1/(R_1+R_2)$. In practice this occurs when the series control circuit is composed of several transistors in cascade. Then the input voltage divider $R_1$ and $R_2$ will have an advantageously high resistance with a consequent reduction in power loss.

The circuit of FIG. 2 is optimal for temperature stability. In this arrangement, the first stage transistor $T_2$ is connected through resistor $R_9$ to the reference potential 0 and directly to the emitter of transistor $T_5$. The collector of this last transistor is connected to input point 1 of the DC voltage source, and its base is brought to the tap of the input voltage divider of $R_1$ and $R_2$. Thus, the transistor $T_2$ forms a differential amplifier with $T_5$. The temperature variation of the transistor $T_2$ base-emitter voltage is then substantially compensated by the auxiliary transistor $T_5$. In addition, the common emitter resistor $R_9$ counteracts the temperature-dependent rise of the collector current.

FIG. 2 also shows a possibility for connecting a series constant-current load $R_{L2}$. The load resistor $R_{L1}$ of the source is then held constant. This connection, as shown, consists of a simple switch 4 which brings the resistor $R_{L2}$ into the series circuit between $T_1$ and $R_{L1}$. Thus, the constant voltage source can be quite simply used as a constant current source.

The advantages of this invention are the following:

It is possible to obtain a relatively high potential difference between the base of the control circuit transistor and the emitter of the control transistor since this potential difference is split up between the transistor $T_2$ and the control transistor. At the same time, a relatively high input voltage variation is permissible because the high voltage divided between the transistor $T_2$ and the control transistor is reduced by the input voltage divider ratio. The transistor $T_2$ makes it possible to operate the control amplifier with low collector current; this has a favorable effect on the circuit's behavior with temperature. Through the use of the transistor $T_2$ and both voltage dividers, the variation in input voltage is nearly completely regulated by means of the noise circuit.

I claim:

1. A constant voltage source comprising a transistor series control circuit a load resistor, a load shunting resistance voltage divider, a control circuit with a control amplifier and a reference voltage source and a noise circuit for bypassing input voltage variations, a transistor whose collector is tied to the base of the control circuit transistor and whose base is connected to the output of the control amplifier and through a resistor to the tap of a voltage divider having two resistors parallel to the control circuit transistor between its input and output, and a voltage divider having two resistors in series, the tap of which is tied to the emitter of the transistor, connected in parallel to the series control circuit transistor.

2. The constant voltage source according to claim 1, which further comprises the connection of the emitter of the transistor through a resistor to a reference potential and directly to the emitter of a transistor whose collector is tied to the input and whose base is wired to the tap of voltage divider.

3. The constant voltage source according to claim 1, which further comprises a series connection for a constant-current load with the load resistor held constant.

4. The constant voltage source according to claim 2, which further comprises a series connection for a constant-current load with the load resistor held constant.

5. A constant voltage source according to claim 1, wherein the resistance ratio of the voltage divider components is variable.

6. In a transistorized constant voltage source comprising a transistor series control circuit, a load shunting resistance voltage divider, a control circuit with a control amplifier and a reference voltage source and a noise circuit for bypassing input voltage variations, the improvement which consists of a first stage transistor whose collector is tied to the base of the control circuit transistor and whose base is connected to the output of the control amplifier and through a resistor to the tap of a voltage divider having two resistors parallel to the control circuit transistor between its input and output, and a voltage divider having two resistors in series, the tap of which is tied to the emitter of the first stage transistor, connected parallel to the series control circuit transistor.